United States Patent [19]
Payne

[11] Patent Number: 5,329,381
[45] Date of Patent: Jul. 12, 1994

[54] AUTOMATIC ENGRAVING METHOD AND APPARATUS

[76] Inventor: John H. Payne, 3401 - 75th Ave. North, Brooklyn Park, Minn. 55443

[21] Appl. No.: 839,403

[22] Filed: Feb. 20, 1992

[51] Int. Cl.$^5$ .............................................. H04N 1/40
[52] U.S. Cl. ................................. 358/455; 358/443; 358/447; 358/463
[58] Field of Search .................. 430/269; 101/150; 358/299, 443, 447, 296, 401, 455, 456, 474, 463, 471; 156/345

[56] References Cited

U.S. PATENT DOCUMENTS

| | | | |
|---|---|---|---|
| 4,013,831 | 3/1971 | Dölves et al. | 358/299 |
| 4,052,739 | 10/1977 | Wada et al. | 358/299 |
| 4,944,826 | 7/1990 | Zollman et al. | 156/345 |
| 5,088,864 | 2/1992 | Yanagida | 358/299 |

OTHER PUBLICATIONS

Advertisement *Sublimination, The Next Generation*, Nova Chrome, The Engravers Journal, May/Jun. 1991, p. 54.
*Digital Image Processing-Operational Breakdown*, Gregory A. Baxes, Cascade Press, pp. 8-11, (1984).
*Digital Image Processing*-Second Edition, William K. Pratt, John Wiley & Sons, Inc. 1991, pp. 339-343.
*Digital Image Processing*-Second Edition, William K. Pratt, John Wiley & Sons, Inc. 1991, pp. 291-295.
"Theory of edge detection", D. Marr and E. Hildreth, Procedings Royal Society of London, 1980, pp. 187-217.
"Edge detection in images using Marr-Hildreth filtering techniques", T. G. Smith, W. B. Marks, W. H. Sheriff Jr., and E. A. Neale, Journal of Neuroscience Methods, 26 (1988), pp. 75-82.
"Fast Algorithms for Low-Level Vision", Rachid Deriche, IEEE PAMI, vol. 12, No. 1, Jan. 1990, pp. 78-87.
"Optimal Edge Detectors for Ramp Edges", Maria Petrou and Joseph Kittler, IEEE PAMI, vol. 13, No. 5, May 1991, pp. 483-491.
National Conference Rapid Prototyping, Sponsered by the Rapid Prototype Development Laboratory Center for Advanced Manufacturing, University of Dayton, Ohio Jun. 4-Jun. 5 1990.

*Primary Examiner*—Edward L. Coles, Sr.
*Assistant Examiner*—Jerome Grant, II
*Attorney, Agent, or Firm*—Leone & Moffa

[57] ABSTRACT

An automatic engraving system scans an image such as a photograph, samples and resizes the image to provide a masterized gray scale data base of the image. The image is then logarithmically corrected and noise is removed from the image using the Outlier noise reduction method. The Outlier noise reduced image is then smoothed and edge detection methods are used to provide an output that represents the initial image filtered smoothed and edge detected. The edge detection image is then converted to a bilevel image using thresholding. The bilevel image is then converted to a vector form and speckle noise removed. The speckle noise removed image is then converted to a vector engraving file which is sent to an engraving machine. The engraving process then can batch create one or more than one image or multiple numbers of a single image. The output can be printed rather than engraved to produce the artistic effect of traditional engraving on paper.

15 Claims, 2 Drawing Sheets

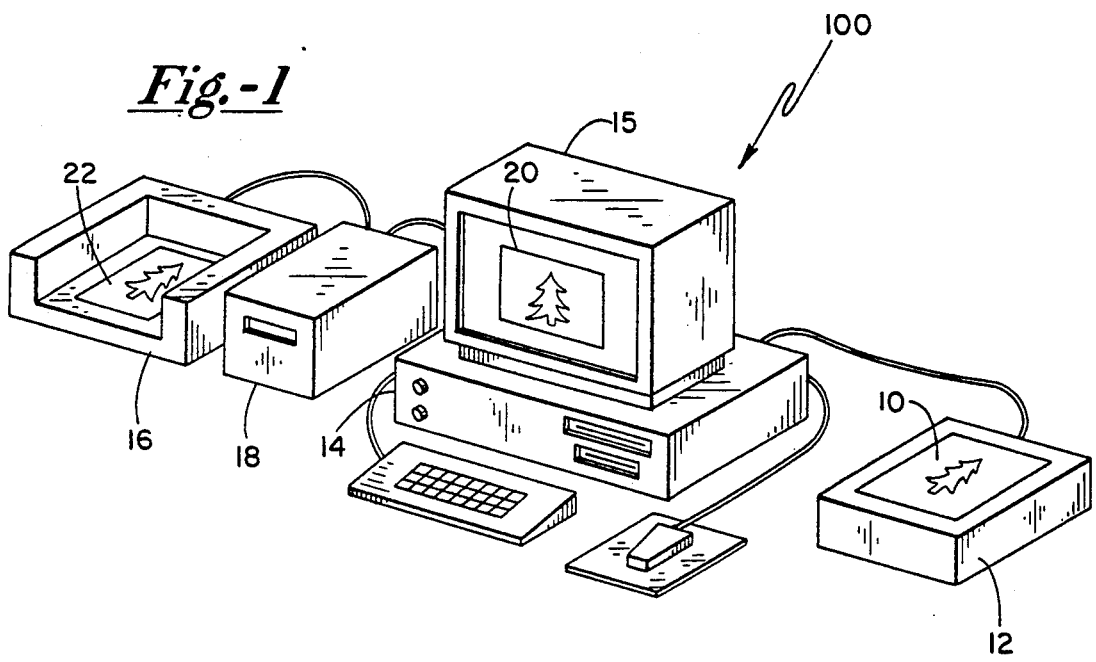
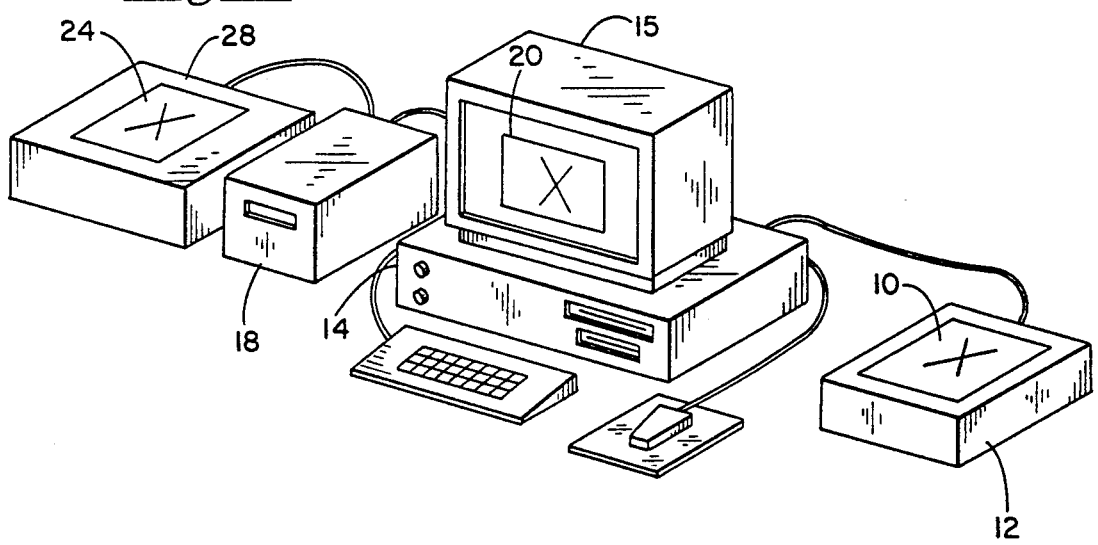

IMAGE CAPTURE

IMAGE PROCESS

IMAGE CONVERSION

BATCHED OUTPUT

AUTOMATIC ENGRAVING METHOD AND APPARATUS

This invention relates to a method of converting a scanned image into an engraving, and more particularly to a method of generating an engraving using a scanned image data base logarithmically corrected and converted into a vector engraving data base that is then used to automatically engrave a representational engraving of the scanned image.

BACKGROUND OF THE INVENTION

The field of engraving enjoys a large number of applications from commercial applications, including engraving of complex patterns to form a picture, to the engraving of metals for ornamental purposes. There are a number of methods of automatically engraving metal surfaces and other objects including YAG laser engravers, $CO_2$ laser engravers, Mechanical engravers, Photo engravers, Silk screening, and desktop publishing working with photographs.

YAG Laser Engravers

YAG lasers can engrave metal surfaces at high speeds. They do a particularly good job of blackening stainless steel and are often used to label or serialize metal parts.

Typically the YAG laser is controlled by a PC utilizing a controller developed for plotting. Work pieces are fed manually, one at a time. For this reason the YAG laser must be attended on a continuous basis during operation.

Scanning and engraving of logos and artwork is already familiar to most YAG laser engravers, however it would be typical to scan an original once, and then produce many hundreds or thousands of engraved objects all with the same artwork. Prior art YAG laser engravers have not developed the concept of each engraved object being unique.

Currently YAG lasers accept output files in vector format (e.g. DXF and HPGL), but direct output of raster files is becoming available. The YAG laser engravers can engrave a continuous-tone or halftone on metal but do not have the capability to convert photographs to traditional engraving.

$CO_2$ Laser Engravers $CO_2$ lasers can engrave wood and some other materials at high speed. They work well with anodized aluminum, but poorly if at all with other metals. Over 80% of all $CO_2$ commercial work is on wood. Continuous-tone or halftone effects are available and are already in common use on wood.

Older $CO_2$ laser systems lacked software but could scan and engrave at high speeds. This included the scanning and engraving of continuous-tone photographs on wood.

$CO_2$ lasers do not work well with metals. Often they do not even get cleanly through the lacquer on a lacquer-coated metal workpiece. However $CO_2$ lasers dominate the engraving of wood, and seem likely to retain this position.

As with the YAG laser engravers there is no capability to convert photographs to traditional engraving. Also, there is not much support for each workpiece being unique. It is far more common to produce hundreds or thousands of the same design.

Mechanical Engravers

Mechanical engravers are typically less expensive and slower than laser engravers. This form of engraving includes both rotary and diamond-drag engraving, and works well on a number of metal and other engravable materials. Both rotary and diamond-drag engraving can usually be done on the same machine.

The spindle motor is turned off and cutting tools switched to change a rotary engraver into a diamond-drag engraver. This equipment is similar to NC equipment, but generally smaller, simpler and capable of only "two" or "two and a half" axis operations. Diamond-drag engraving works well on a number of materials including: anodized aluminum, lacquered aluminum, brass, silver, and some plastics designed specifically for diamond-drag engraving.

Mechanical engravers are popular in trophy shops, small engraving businesses, and shopping malls. It is now fairly common for these machines to be controlled by a computer often using a modified controller as with the laser engraving machines.

No prior art engraving process possesses the capability to convert photographs to traditional engraving. Diamond-drag rather than rotary engraving is used for very fine graphic design detail on metal.

Photo-Engravers

Photo-Engraving refers to a chemical process for etching a surface, usually magnesium. This form of engraving does not use computers. This process can start from a photograph and produce a very pleasing image on magnesium. There is a limited market for magnesium plaques produced in this way. Those skilled in the art will recognize that the problem with magnesium is that it is very reactive and tends to deteriorate very rapidly. This has greatly held back the popularity of this form of engraving.

More often the magnesium plate is used as an intermediate step in producing something else. The biggest application is in printing and hot stamping. But magnesium plates are also used as jewelry molds and even as molds for novelty items such as tiles with photo images (raster-type continuous-tone) on each tile.

This process is very inexpensive but would be difficult to scale up to high volume production of unique images, since a magnesium mold would have to be made for each image. Also there are problems with chemical fumes, chemical safety and disposal, zoning restrictions, and the consumption of raw material, especially magnesium. As with the other processes described, there is no capability to convert photographs to engravings.

Silk Screening

Silk Screening would not normally be considered an engraving technique, but it is certainly capable of reproducing finely detailed graphics on flat metal surfaces. Silk Screening has environmental challenges similar to Photo-Engraving. Silk Screening probably could scale up more cost effectively than Photo-Engraving in cases where each output image is unique. For example, if 20 unique graphic images (bilevel, black and white) were printed on one sheet of paper they could all be Silk Screened inn one motion. This would require a little more elaborate fixturing than normally used, but probably could be done at very low cost. Like the other methods Silk Screening lacks the capability to convert a photograph to a traditional engraving.

Desktop Publishers Working with Photographs

This category includes companies in desktop publishing working with photographs. There is some image processing capability in some of the newer software packages (e.g. Picture Publisher Plus), but it is oriented towards special effects at this time. There is also a lot of development of 4-color separation and other prepress work ongoing. At this point desktop publishers appear to lack the capability to convert photographs to traditional engravings.

Image Processing

The Image Processing field has contributed a research literature and mathematical basis for important aspects of this invention. But the Image Processing field is focused on larger scientific applications such as satellite imagery and medical diagnostics, not engraving. There is no capability within the Imaging Processing field to convert a photograph to a traditional engraving.

CAD/CAM

CAD/CAM technologies use computer control over a manufacturing device, often an NC machine that is far more complex than an engraving machine. Also, DXF and HPGL formats are widely used in this market. As with the other methods there is no capability to convert photographs to engraving.

Desktop Manufacturing

Desktop Manufacturing involves using a computer and a novel manufacturing process to produce a 3D object (model or prototype) much more quickly than would normally occur. It is also intended to provide much more flexibility and more iterations of design changes at lower cost than traditional processes.

Although the emphasis is on 3D objects, closer examination reveals that in many cases these 3D objects are actually manufactured from a large number of thin 2D slices stacked one on top of the other. There is no capability to produce engravings from photographs by desktop manufacturing.

Custom Minting

Custom minting is a specialized form of metal stamping used in the production of coins, medallions, and some flat jewelry pieces. The artistic effect is of a bas-relief or sculpted appearance usually, rather than traditional engraving. But either can be achieved. Custom minting typically requires the production of an expensive hand-tooled die.

Custom minting is very cost effective in high volume production but depending on the metal the stamping may have to be attended, may require human inspection of each workpiece, and frequent removal and servicing of the die. As with other techniques there is no capability to generate an engraving from a photograph.

Metal Foto

Metal Foto is a chemical process that develops a photographic image on a flat aluminum surface. Samples can be seen in some trophy shops on flat aluminum plaques. A drawback of this technique is that there is always a yellow haze over the plate caused by the chemicals. Also, this process only works with aluminum. This process does not produce a traditional engraved look and does not make any use of computers.

Sublimation

Sublimation is the process used most commonly on hats and T-shirts where a logo artwork, or photograph is reproduced. Sublimation technology claims to work on metal surfaces. This look of bright colors and detailed graphics on metal is starting to appear in retail shopping malls.

One company that advertises "next generation" sublimation capability in *The Engravers Journal* (May/June 91) is Nova Chrome of Pleasant Hill, Calif. The advertisement describes this process as capable of "custom heat-applied transfers", and shows results on metal plaques. It appears to work with artwork, including color artwork, but no normal, that is continuous-tone type photographs are depicted. There is no capability to produce engravings from photographs, no capability to produce the look of traditional engraving and no usage of image processing software.

In summary, the above-described engraving processes all require manual intervention at one or more than one process step. It is therefore one primary motivation of the invention to totally automate the engraving of metal plates and other types of engraving plates from a scanned image.

SUMMARY OF THE INVENTION

The invention provides a mechanism to receive a scanned image such as a photograph and samples the image. The image is resized and rasterized. A data base of the image is created. The image is then logarithmically corrected and noise is removed from the image. The noise reduced image is then smoothed and edge detection methods are used to provide an output that represents the initial image filtered, smoothed and edge detected. The edge detection image is then converted to a bilevel image using thresholding. The bilevel image is then converted to a vector form and speckle noise is removed. The speckle-noise-removed image is then converted to a vector engraving data base which is sent to an engraving machine. The engraving process then can batch create one or more than one image or a multiple number of single images.

It is one object of the invention to provide an improved automatic engraving method and apparatus that enables scanning and engraving to work with photographs which are normally continuous-tone images, and a poor subject for scanning and engraving.

It is another object of the invention to provide an improved automatic engraving method and apparatus that is affordable in quantities of one while mass production benefits even if each photograph is unique and only one engraving is made from each photograph.

It is a further object of the invention to provide an improved automatic engraving method and apparatus that lower manufacturing cost because it is highly automated.

It is yet a further object of the invention to provide an improved automatic engraving method and apparatus that eliminates most setup and manual labor required by other methods.

It is yet a further object of the invention to provide an improved automatic engraving method and apparatus that achieves a consistently high artistic quality with the look of traditional engraving.

It is a further object of the invention to provide an improved automatic engraving method and apparatus that uses no toxic chemicals, fumes or has any associated waste disposal problems and is appropriate for an office environment.

It is an object of the invention to provide an improved automatic engraving method and apparatus that accommodates existing devices and works with a variety of output devices such as YAG laser engravers, printers, plotters, sublimination processors, CO2 laser engravers, and mechanical engravers.

It is yet a further object of the invention to provide an improved automatic engraving method and apparatus that allows smooth production scale-up while using existing capabilities and that can be scaled-up incrementally without major reengineering or major technical problems.

It is a further object of the invention to provide an improved automatic engraving method and apparatus that uses less wasted material by eliminating consumption of raw materials such as in die-making or as in chemical etching.

Other objects, features and advantages of the present invention will become apparent to those skilled in the art through the description of the preferred embodiment, claims and drawings herein where like numerals refer to like elements.

BRIEF DESCRIPTION OF THE DRAWINGS

FIG. 1 shows the schematic of the apparatus of the invention used to automatically engrave.

FIG. 6 shows the method of the invention used to create two dimensional engravings of a three dimensional cross section object.

DETAILED DESCRIPTION OF THE PREFERRED EMBODIMENT

Figure 2:
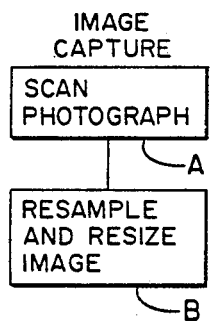
FIG. 2 shows a schematic flow diagram of the image capture method of the invention.

Now referring to FIG. 1 which shows a schematic diagram of the apparatus of the invention. The invention 100 is used to convert an image 20 of an object 10 into an engraving 22 of the object. The configuration of the invention is shown in FIG. 1 and includes a scanner 12 upon which the object 10 is placed. The scanner 12 scans the image 20 of the object 10 into a data base contained within computer 14 which shows the scanned image 20 on screen 15. The computer 14 then processes the image 20 according to the methods of the invention described below and controls an engraver controller 18 to make the engraving 22 of the image 20 using the engraver 16.

Now that the structure of the invention is disclosed the method of converting the scanned image 20 to an engraving 22 will be disclosed.

Referring now to FIG. 2 which shows the method of capturing the image of the invention. Step A shows the scan photograph method of the invention. In one embodiment of the invention an HP Scanjet+ scanner is used to scan the image. The scanning resolution is kept below 200 DPI (dots per inch). It is necessary to scan at 256 gray scale. The scanned image is stored in one of the following widely used raster formats: GIF, PCX, or TIFF version 5.0. Using smaller photographs (e.g. 2½ inches by 3½ inches) helps to reduce file sizes and speeds subsequent processing.

A computer program such as, for example, ScanXpres (TM) Software from Digital Research of Monterey, Calif. is the best software for driving the scanner. Image-In (TM) Software from Image-In, Inc. of Minneapolis, Minn. is acceptable but brings the overhead and complexity of the Windows (TM) 3.0 system environment.

File naming and directory naming conventions are necessary when scanning a large number of photographs for subsequent processing.

For each pixel scanned, the basic information captured in the scan includes: the x coordinate, the y coordinate, and the intensity. Intensity is simply the gray scale value from 0 to 255 where 0 equals black, and 255 equals white. In addition the file size, resolution in X and Y directions, and image dimensions are saved in the file header for each image.

Scanning can be decoupled from the subsequent processing and done at a separate physical location. The results are then stored on computer disks in specific named directories for later processing.

A variety of techniques can be used for image capture as long as a 256 gray scale raster image is produced. Substitutes include video/frame grabber, digital camera, FAX machine, and light microscope.

Step B shows the resampling and resizing image method of the invention. In one embodiment of the invention standard size photographs (e.g. wallet-size) are scanned in Step A. They are scanned at one resolution properly aligned and do not need cropping. Other size photos require image resizing Step B.

In some cases photographs may have been scanned at too high a resolution for efficient processing. Alternatively, the photographs scanned may have been of different physical sizes, or different resolutions. Finally, it may be necessary to crop the image to remove extraneous detail. For these cases resampling resizing or cropping of the image may be necessary.

In the resampling process the image is sampled at a lower resolution. The resizing refers specifically to changes in dimensions while keeping the resolution constant. Cropping involves eliminating everything outside a defined section of the image, usually a rectangle. In one preferred embodiment of the invention Step B is accomplished using the Image-In (TM) Software by Image-In, Inc. from Minneapolis, Minn. under the DOS Windows 3.0 environment.

Figure 3:
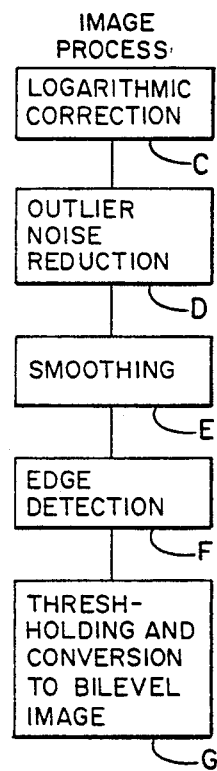
FIG. 3 shows a schematic diagram of the image processing method of the invention.

Now referring to FIG. 3 which shows the method of image processing of the invention to convert the scanned image into a threshold crossing bilevel image data base. Step C shows the logarithmic correction method of the invention.

In many image processing applications the computer 14 is used to detect what the human eye cannot. But in this invention it is necessary to effectively create an engraving data base to detect features in a way that is consistent with what a human viewing the photograph would expect. In general: if the human eye cannot easily discern a feature in the photograph it should not be in the engraving; if the human eye can easily discern a feature in the photograph it should appear in the engraving.

The human eye does a better job of discriminating the dark region of the spectrum than the light regions of the spectrum. For example, a human eye can distinguish dark hair from a dark background in a modern portrait photograph. There is sufficient discrimination in the dark region of the spectrum to make sensible discrimination. Normally a computer will fail to make this distinction.

In one embodiment of the invention this phenomena is corrected by taking the logarithm of the scanned image. The intensity of each pixel (gray scale value from 0 to 255), as described in Section A, is changed by the logarithmic compensation so that the computer image much more closely matches the human perception of the image. An excellent description of this visual phenomena and the role of logarithmic enhancement is found in "Digital Image Processing—A Practical Primer" Gregory A. Baxes, Cascade Press, pages 8–11.

Logarithmic correction Step C is the first image processing step. It is necessary to produce results consistent with what a human observer would expect to produce an acceptable engraving image. Failure to perform the logarithmic correction will produce results with too much detail in the bright end of the spectrum and too little detail in the darker region of the spectrum. For example, the sampling may fail to detect dark hair against a dark background in the original photograph.

The prior art does not provide guidance in how to implement the logarithmic correction. The method of the invention specifies that:

for an input value of 0 the output value is 0, for input values of 1 through 255: the output value=(log10(input value) * 105.96126)+.5

In automatic engraving method pixel values range from 0 (black) to 255 (white). This full range of gray scale values is allowed for both the input and output pixel values.

The scaling factor of 105.96126 used in the above equation was determined as follows:

If the input value is 255, the output value should also be 255 in order to continue to use the full range of values available (255 is the largest value that can be stored in an 8-bit byte). The C function log10(255) returns a value of 2.406540 therefore the constant is 105.96126 (since 2.406540 * 105.96126 approximates 255). The log10 function is not applied when the input value is zero, since the logarithm of zero is undefined.

Finally, in converting the floating point value returned by the C function log10 to an integer value the results are simply truncated. Therefore a value of 0.5 is added to the conversion in order to compensate for this.

A lookup table is advantageously used to speed the execution of this algorithm. The algorithm results are stored in the lookup table. The value input of each pixel is then used as an index to retrieve the previously calculated output value.

Logarithmic correction is implemented as a "point process" which involves replacing each pixel in an image with a value computed from itself and some constants, neighboring pixels play no role in this. Also, the use of a lookup table means that the algorithm is only executed 255 times per image rather than being executed for each pixel, potentially millions, in the image. Experimental trials indicate that overall image processing quality improves significantly when Step C is performed.

Step D shows the Outlier noise reduction method of the invention. Scanned photographs contain noise which must be removed. In step D a noise reduction filter is used to provide some initial noise reduction. Those skilled in the art will appreciate that other noise reduction techniques could also be used such as those that reduce speckle noise. The need to do this varies depending on the type of image capture performed in Step A. For example, a light microscope image will be free of noise and this step can be omitted. Specific substitutes are listed in *Digital Image Processing*, Second Edition, William K. Pratt, Wiley-Interscience 1991. Pratt provides image noise models for sources such as sensor noise, film grain irregularities, and atmospheric light fluctuations.

The Outlier filter is a 3×3 spatial convolution with kernel coefficients of:

$$\begin{matrix} 1 & 1 & 1 \\ 1 & 0 & 1 \\ 1 & 1 & 1 \end{matrix}$$

A description for this "Outlier" filter is found in "Digital Image Processing—Second Edition", William K Pratt, Wiley Interscience, pages 291–295.

The "Outlier" filter is a nonlinear noise cleaning technique in which the intensity of each pixel is compared to the average intensity of its 8 neighboring pixels. If the difference is greater than a threshold value, the intensity value is replaced by its neighborhood value.

Spatial convolution is used to compute the neighborhood average (but the multiplication instructions are omitted for greater speed and since the kernel coefficients are all equal to 1).

It is permissible to reverse the order of steps C and D. This will tend to produce a slightly more detailed result at the expense of some increase in subsequent processing.

Step E shows the smoothing method of the invention and step F shows the edge detection method of the invention. Steps E and F smooth out the scanned image of object 10 and perform edge detection. In one embodiment of the invention these steps are accomplished in one spatial convolution using a Marr-Hildreth "Mexican Hat" filter with dimension 7×7 and with coefficients of:

$$\begin{matrix} 0 & 0 & -1 & -1 & -1 & 0 & 0 \\ 0 & -1 & -3 & -3 & -3 & -1 & 0 \\ -1 & -3 & 0 & 7 & 0 & -3 & -1 \\ -1 & -3 & 7 & 24 & 7 & -3 & -1 \\ -1 & -3 & 0 & 7 & 0 & -3 & -1 \\ 0 & -1 & -3 & -3 & -3 & -1 & 0 \\ 0 & 0 & -1 & -1 & -1 & 0 & 0 \end{matrix}$$

This filter takes the Laplacian of a Gaussian. That is, a Gaussian smoothing is followed by Laplacian edge detection. An excellent description of the theory behind this filter is found in the paper "Theory of edge detection", D. Marr and E. Hildreth, *Proceedings Royal Society of London*, 1980, pages 187–217. A recent implementation of this filter is documented in a paper titled "Edge detection in images using Marr-Hildreth filtering techniques", T. G. Smith, W. B. Marks, G. D. Lange, W. H. Sheriff, Jr., and E. A. Neale, *Journal of Neuroscience Methods*, 26 (1988), pages 75–82. These authors are all with the National Institute of Health (NIH) in Bethesda, Md. A key finding in the NIH paper was the effectiveness of the Marr-Hildreth edge-detecting algorithm in obtaining a continuous border of labeled neurons, whereas other commonly used edge detectors produced borders with gaps.

Those skilled in the art will recognize that the integer coefficients are approximations of real values and were calculated to get the best results on a personal computer without roundoff errors. It is important to note that in natural images (e.g. a photograph of a human face) the edges you need to detect are ramp edges not step edges.

Alternate methods of smoothing and edge detection may be found in the following listed articles:

"Fast Algorithms for Low-Level Vision", Rachid Deriche, IEEE PAMI Vol. 12, No. 1, January 1990.

"Optimal Edge Detectors for Ramp Edges", Maria Petrou and Josef Kittler, IEEE PAMI Vol. 13, No. 5, May 1991.

These methods may come at the expense of much greater computational demand. Those skilled in the art having the benefit of this disclosure will recognize that it is also possible to increase the size of the kernel and to use real coefficients instead of integer coefficients.

The uninterrupted continuous borders produced by the Marr-Hildreth method corresponds to the contour form of raster-to-vector conversion described below in reference to Step H, enabling artistically pleasing and efficient engraving of photographs. Optionally, Steps D, E and F may all be implemented as fast Fourier Transforms instead of spatial convolutions, the kernel size could be changed and floating point math used in certain applications.

Step G shows the thresholding and conversion to bilevel image method of the invention. In Step G pixels with intensity levels below a predetermined threshold value (currently 124 of 256) are converted to black and all other pixels are converted to white. The overall effect is that the scanned gray scale image now becomes a much simpler bilevel image containing only black and white pixels. A secondary effect is that the size of the file needed to store this information is greatly reduced.

In an alternate embodiment of the invention more sophisticated thresholding is used. Of specific interest is "hysteresis thresholding" which uses two threshold levels and intelligent processing of the closed filled contours, i.e. the "blobs". The alternate embodiment of hysteresis thresholding is desireable when working with higher resolution images. Hysteresis thresholding is a powerful post-processing technique for cleaning the great increase in noise common in higher resolution images.

Hysteresis thresholding occurs immediately after Step F, Edge Detection, has been completed. The steps are:

1. First the border areas of the scanned image 20 are cleared to 255 (White). This corrects for possible edge effect damage from Step F;
2. A relatively high upper threshold is set. All pixels with gray scale values greater than or equal to this threshold are rejected as noise and are cleared to 255 (White);
3. What remains is a large number of gray scale "blobs" on a white background. Each "blob" in the scanned image 20 is further analyzed to determine:
   (a) the number of pixels in the "blob";
   (b) the average gray scale value of the "blob";
   (c) whether the "blob" contains a "hero pixel", i.e. a pixel which was clearly detected as an edge.
4. The information about each "blob" is used to determine whether it is noise. "Blobs" that are noise are changed to 255 (White);
5. All surviving gray scale "blobs" are converted to 0 (Black) producing the Step G bilevel image containing only black and white pixels.

After step G is substantially completed an engraving image has been created. It can be printed, viewed, or modified manually.

Figure 4:
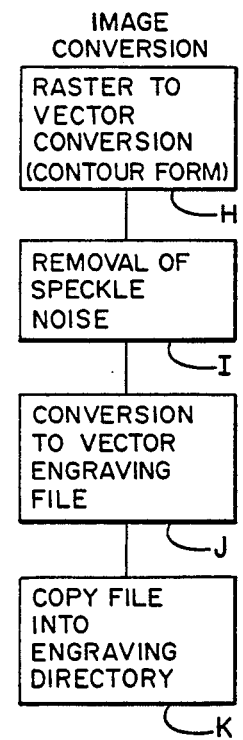
FIG. 4 shows a schematic diagram of the image conversion method of the invention.

Now referring to FIG. 4 which shows the method of image conversion of the invention used to convert the raster information to an engraved data base. Step H shows the raster-to-vector conversion method of the invention. The next step is to convert the raster image into a vector format for engraving. In one embodiment of the invention the vector data is written in encapsulated Postscript.

Experimental trials with Raster-to-Vector conversion, Step H indicated that the filled contours method rendered the most pleasing engraving.

Step I shows the removal of speckle noise method of the invention. At this point in the process some speckle noise usually remains and must be removed. The noise removed in this step consists of small isolated clusters of black pixels called speckles which are surrounded by white pixels and far removed from other black pixels. This noise removal step complements the earlier noise removal (Step D) and smoothing (Step E) steps, as well as any hysteresis thresholding performed (Step G).

At this point there is also the opportunity to convert the image to either a Bezier or Polyline approximation. The degree of fit can be selected as part of this step. These approximations can greatly reduce file size and speed up subsequent machining steps. However, these improvements come at the expense of some degradation in correspondence with the original photograph. Those skilled in the art having the benefit of this disclosure will recognize that for output devices capable of accepting raster input this step can be omitted. For example, Laser Machining, Inc. of Somerset, Wis. can accept raster formatted data.

Step J shows the conversion to vector engraving file method of the invention. The encapsulated Postscript EPS file format (produced in steps H and I) is widely accepted by Postscript printers and Desktop Publishing software. However EPS is not commonly used in engraving, plotting, or machining. Therefore it is typically necessary to convert the EPS file to a compatible vector format such as HPGL or DXF. Those skilled in the art will recognize that steps H and J may be completely unnecessary for some devices. Physical resizing of the vector image may also be performed at this stage.

Step K shows the copy files into engraving directory method of the invention. The vector engraving files from Step J are copied into a directory which, by convention, only contains a predetermined number of vector engraving files. This facilitates decoupling the actual engraving from the previous steps, and enables further automation of the engraving.

Figure 5:
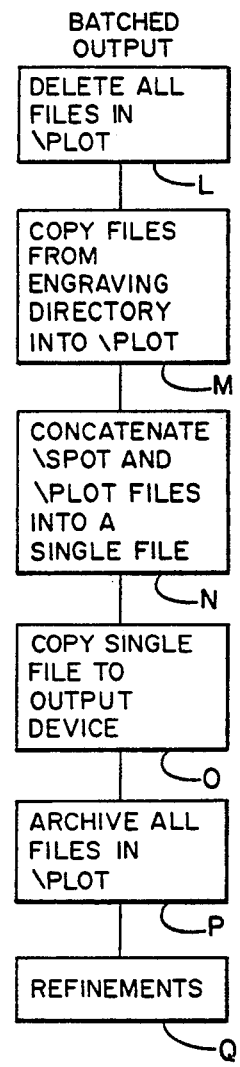
FIG. 5 shows a schematic of the batch output method of the invention.

Now referring to FIG. 5 which shows the method of converting the engraving file into "multiple engravings" data base. Step L shows the delete all files in PLOT method of the invention. Engraving (or plotting, machining, etc.) is a decoupled process and described in Steps L, M, N, O, P, and Q. A physical DOS directory called PLOT is created and, by convention, used only for this purpose. By convention, it is given the name PLOT.

A second DOS directory, called SPOT, is also established. By convention, SPOT contains the (x,y) coordinates of each separate location in a given engraving tray or fixture. For example, in one example embodiment of the invention an engraving tray is used that will hold fifteen 1½ inch diameter engravable disks. The SPOT directory contains fifteen HPGL files which in turn contain the (x,y) coordinates and other commands necessary to initialize and control engraving at each of the fifteen locations on the tray.

The SPOT directory is permanent and specific to the tray, i.e. fixture. The PLOT directory contains files with the actual images to be engraved; it normally changes after each tray is engraved. The initial step is to delete all files in the PLOT directory. This is an initialization step designed to prevent accidental engraving of files inadvertently left in the PLOT directory from prior runs.

Step M shows the copy files from engraving directory into PLOT method of the invention. The files to be engraved are copied from the Engraving Directory into the PLOT directory. A number less than the maximum can also be used without causing a problem.

Step N shows the concatenate SPOT files and PLOT files into a single file method of the invention. Automatic concatenation o SPOT files and PLOT files is now used to create a single output file which contains positioning and engraving commands for unattended engraving of multiple files.

Step O shows the copy single file to output device method of the invention. Engraving is initiated by a single DOS COPY command. In one example embodiment of the invention a Roland CAMM-2 engraver is connected to a PC via parallel port 1 (LPT1) and defined as an HP 7475A plotter.

Step P shows the archive PLOT files method of the invention. All engraving files in PLOT are now archived if desired using a single DOS COPY command of the form:

COPY PLOT *.* ARCHIVE
uniquefilenames

An additional file name discriminator, such as date/time stamp, is used to create unique ARCHIVE file names. This is to prevent overwriting previously archived files.

Step Q shows the refinements method of the invention. Refinements may be made depending on the specific output device being used, the following refinements are worth noting:

(i.) Z-axis control: In a mechanical engraver it is necessary to ensure that the cutting tool clears fixtures as it moves from one location to the next;

(ii.) Changing Fixtures/Viewing Results: It may be desireable to move the tooling out of the way to permit viewing of engraving results and to permit changing of fixtures. The result is that the tool automatically moves out of the way and engraving stops after each tray has been engraved. A new empty tray is then inserted in place of the tray just completed; and (iii.) Reestablishing the Origin of the Output Device: Prior to beginning engraving of each new tray or fixture it may be necessary to reestablish the origin of the output device.

Now referring to FIG. 6 which shows the method of the invention used to generate a stacked 3D output 24 from a set of cross sectional 2D images. In the last few years a number of 3D Output Devices have been introduced as part of an emerging field called Desktop Manufacturing or Rapid Physical Prototyping.

3D Output Devices that have gained the greatest initial acceptance all build 3D objects one cross sectional 2D layer at a time. In other words they are not functioning like multi-axis NC machines, but in this respect are more like printers or plotters. In fact sometimes the term 3D printing is used to described this approach. Normally, in the prior art a true 3D model (CSG, BREP, Wireframe, etc.) is created in the computer, and then "sliced" into 2D layers. The layers are then used to drive the 3D Output Device. Unfortunately, creating this type of 3D model can be quite involved and is recognized in the art as the major remaining bottleneck in this whole process. Slicing the 3D model is also non-trivial.

In the present invention a much more direct approach can be considered. An original object can be scanned at varying depths to produce 2D slices from object 10. A gray scale raster image 20 is created for each slice 10. These slices 10 can be then fed through the processes outlined in FIGS. 2, 3, 4 and 5 one slice 10 at a time. The results can drive the 3D Output Device 28 one layer, shown generally as element 24, at a time.

A raster-based 3D Output Device 28, shown in FIG. 6, will require only the first steps in FIGS. 2 and 3. A vector-based 3D Output Device will also require the processing outlined in FIG. 4. The invention makes it easy to switch between producing a part or the mold for a part. This can be done by simply negating the image of each slice right after Step G—Thresholding and Conversion to Bilevel Image.

This direct approach will be most advantageous when working with natural objects because the invention is designed to detect ramp edges as well as step edges. Applications could include making a model for a surgeon prior to surgery, or making jewelry molds based on natural objects. In the first case a non-invasive scanning procedure is used to capture the layer images. In the jewelry example a natural object may be physically sliced and photographed with a digital camera to capture the layer images. The captured layer images can be easily changed in an almost unlimited variety of ways once in the computer. A physical model or mold can then be made of the original object, with or without changes, through the automatic engraving method of the invention and the 3D Output Device.

As is normal practice for 3D Output Devices each slice would be cut all the way through. A variety of techniques are used to subsequently fasten each layer to the next. It is possible to build some objects that could not be made in any other known way. This includes objects with elaborate and possibly fragile internal structures and even structures derived from non-Euclidean geometry.

The principal advantages of using the invention with 3D Output Devices are:

1. it can work directly from gray scale raster input;
2. there is no need to build complicated 3D geometry model;
3. there is no need to slice a complicated 3D geometry model; and
4. it is significantly faster.

The method and apparatus of the invention can be used with varying substitute objects for the different components of the invention. Those skilled in the art will recognize that the techniques of the invention and methods can be applied to varying types of scanning and engraving devices.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method of automatic engraving comprising the steps of:
   (a) scanning an image to create a database of image points;
   (b) logarithmically correcting each point of the image;
   (c) performing edge detection on the image database to produce an edge detection image database;
   (d) performing a raster-to-vector conversion of the edge detection image database to generate a vector database; and
   (e) converting the vector database to a vector engraving file.

2. The method of claim 1 further including the step of resampling and resizing the database of image points.

3. The method of claim 1 further including the step of performing thresholding on the edge detection image database.

4. The method of claim 1 further including the step of performing a bilevel image conversion to produce a bilevel image output of the edge detection image database.

5. The method of claim 1 further including the step of removing speckle noise from the edge detection image database.

6. The method of claim 1 wherein the edge detection step further comprises the Marr-Hildreth "Mexican Hat" filter.

7. The automatic engraving method of claim 1 wherein the image is copied to an engraving directory.

8. The automatic engraving method of claim 1 wherein the step of converting the vector database to a vector engraving file further comprises the step of storing the vector engraving file in a plot directory capable of compiling a plurality of vector engraving files and second the plot directory to an engraving device to produce a plurality of different engravings.

9. The method of claim 1 further including the step of performing noise reduction on the logarithmic correction of the image.

10. The method of claim 9 wherein the noise reduction step is carried out according to an Outlier noise reduction method.

11. A method of automatic engraving comprising the steps of:
    (a) scanning an image;
    (b) resampling and resizing the image;
    (c) logarithmically correcting each point of the image;
    (d) performing Outlier noise reduction on the logarithmic correction of the image;
    (e) smoothing the Outlier noise reduction image and producing a smoothed image;
    (f) performing edge detection on the smoothed image to produce an edge detection image;
    (g) performing thresholding on the edge detection image to produce a threshold output;
    (h) performing a bilevel image conversion to produce a bilevel image output;
    (i) performing a raster-to-vector conversion of the bilevel image output to produce a raster-to-vector converted image; and
    (j) converting the raster-to-vector converted image to a vector engraving file.

12. The method of claim 11 wherein the edge detection step further comprise the Marr-Hildreth "Mexican Hat" filter.

13. The automatic engraving method of claim 11 wherein the step of converting the raster-to-vector converted image to a vector engraving file further comprises the step of storing the vector engraving file in a plot directory capable of compiling a plurality of vector engraving files and sending the plot directory to an engraving device to produce a plurality of different engravings.

14. A method of automatic printing comprising the steps of:
    (a) scanning an image;
    (b) resampling and resizing the image;
    (c) logarithmically correcting each point of the image;
    (d) performing Outlier noise reduction on the logarithmic correction of the image;
    (e) smoothing the Outlier noise reduction image and producing a smoothed image;
    (f) performing edge detection on the smooth image to produce an edge detection image;
    (g) performing thresholding on the edge detection image to produce a threshold output;
    (h) performing a bilevel image conversion to produce a bilevel image output;
    (i) printing an object that resembles the image.

15. A method of automatic printing comprising the steps of:
    (a) scanning an image to create a database of image points;
    (b) logarithmically correcting each point of the image;
    (c) performing edge detection on the image database to produce an edge detection image database;
    (d) performing a raster-to-vector conversion of the edge detection image database to generate a vector database; and
    (e) printing an object that resembles the image.

* * * * *